(12) United States Patent
Silver

(10) Patent No.: US 9,911,164 B1
(45) Date of Patent: Mar. 6, 2018

(54) SYSTEM AND METHOD FOR MANAGING RESTAURANT CUSTOMER DATA ELEMENTS

(71) Applicant: Andrew Silver, Dallas, TX (US)

(72) Inventor: Andrew Silver, Dallas, TX (US)

(*) Notice: Subject to any disclaimer, the term of this patent is extended or adjusted under 35 U.S.C. 154(b) by 600 days.

(21) Appl. No.: 14/316,472

(22) Filed: Jun. 26, 2014

Related U.S. Application Data

(63) Continuation of application No. 13/534,195, filed on Jun. 27, 2012, now Pat. No. 8,799,083, which is a continuation of application No. 10/642,841, filed on Aug. 18, 2003, now Pat. No. 8,224,700.

(60) Provisional application No. 60/404,462, filed on Aug. 19, 2002.

(51) Int. Cl.
G06Q 50/12 (2012.01)
G06Q 10/02 (2012.01)
G06Q 20/10 (2012.01)

(52) U.S. Cl.
CPC ............ G06Q 50/12 (2013.01); G06Q 10/02 (2013.01); G06Q 20/102 (2013.01)

(58) Field of Classification Search
CPC ........ G06Q 10/02; G06Q 50/12; G06Q 30/02; G06Q 20/20
USPC ........ 705/15–16, 26.1, 5; 235/379; 283/60.2
See application file for complete search history.

(56) References Cited

U.S. PATENT DOCUMENTS

| | | | |
|---|---|---|---|
| 6,844,893 B1 * | 1/2005 | Miller | G06Q 10/10 348/14.01 |
| 6,848,613 B2 * | 2/2005 | Nielsen | G06Q 20/04 235/379 |
| 2002/0147647 A1 * | 10/2002 | Ragsdale-Elliott | G06Q 20/20 705/15 |

* cited by examiner

*Primary Examiner* — Vanel Frenel

(57) ABSTRACT

This invention is a system and method for managing restaurant customer data elements.

20 Claims, 9 Drawing Sheets

US 9,911,164 B1

SYSTEM AND METHOD FOR MANAGING RESTAURANT CUSTOMER DATA ELEMENTS

CROSS-REFERENCE TO RELATED APPLICATIONS

The present application is a continuation of and claims priority to patent application Ser. No. 13/534,195, titled System And Method For Managing Restaurant Customer Data Elements, filed on Jun. 27, 2012, which is a continuation of patent application Ser. No. 10/642,841, titled system And Method For Managing Restaurant Customer Data Elements, filed on Aug. 18, 2003, now issued U.S. Pat. No. 8,224,700, issued on Jul. 17, 2012, which claims priority to provisional patent application No. 60/404,462, titled System And Methods For Supporting Customer-Managed Processes And Technologies In The Hospitality Food Service (Restaurant) Industry, filed on Aug. 19, 2002. The entire contents of each of these applications is incorporated in their entirety by reference herein.

TECHNICAL FIELD

The present invention generally relates to customer service management systems and methods, and more specifically to restaurant customer service management systems and methods.

STATEMENT OF A PROBLEM ADDRESSED BY THIS INVENTION

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Statement of a Problem Addressed by This Invention is to be construed as prior art.

DISCUSSION

The restaurant and hospitality industry is rapidly changing as a result of the change in the demographics of its customer base and the introduction of new technology. The traditional restaurant experience in which a customer partakes is similar to a model that has been employed for hundreds of years.

The current generation of restaurant customers and operators label this model as antiquated. The current generation of restaurant customers is generally educated, highly competent with technology, and considers time as a valuable commodity. These customers are often impatient and enjoy continuous and interactive entertainment while waiting to be seated or while waiting for a meal to be prepared.

Unfortunately, current restaurant systems, although proven, do not meet the changing needs of this new customer base. Restaurants antiquated systems are cumbersome, lack modern technology, and do not provide entertainment during waiting periods. Furthermore, they are very dependent on management and control from restaurant staff.

BRIEF DESCRIPTION OF THE DRAWINGS

Various aspects of the invention, as well as at least one embodiment, are better understood by reference to the following EXEMPLARY EMBODIMENT OF A BEST MODE. To better understand the invention, the EXEMPLARY EMBODIMENT OF A BEST MODE should be read in conjunction with the drawings in which.

AN EXEMPLARY EMBODIMENT OF A BEST MODE

Interpretation Considerations

Figure 1:
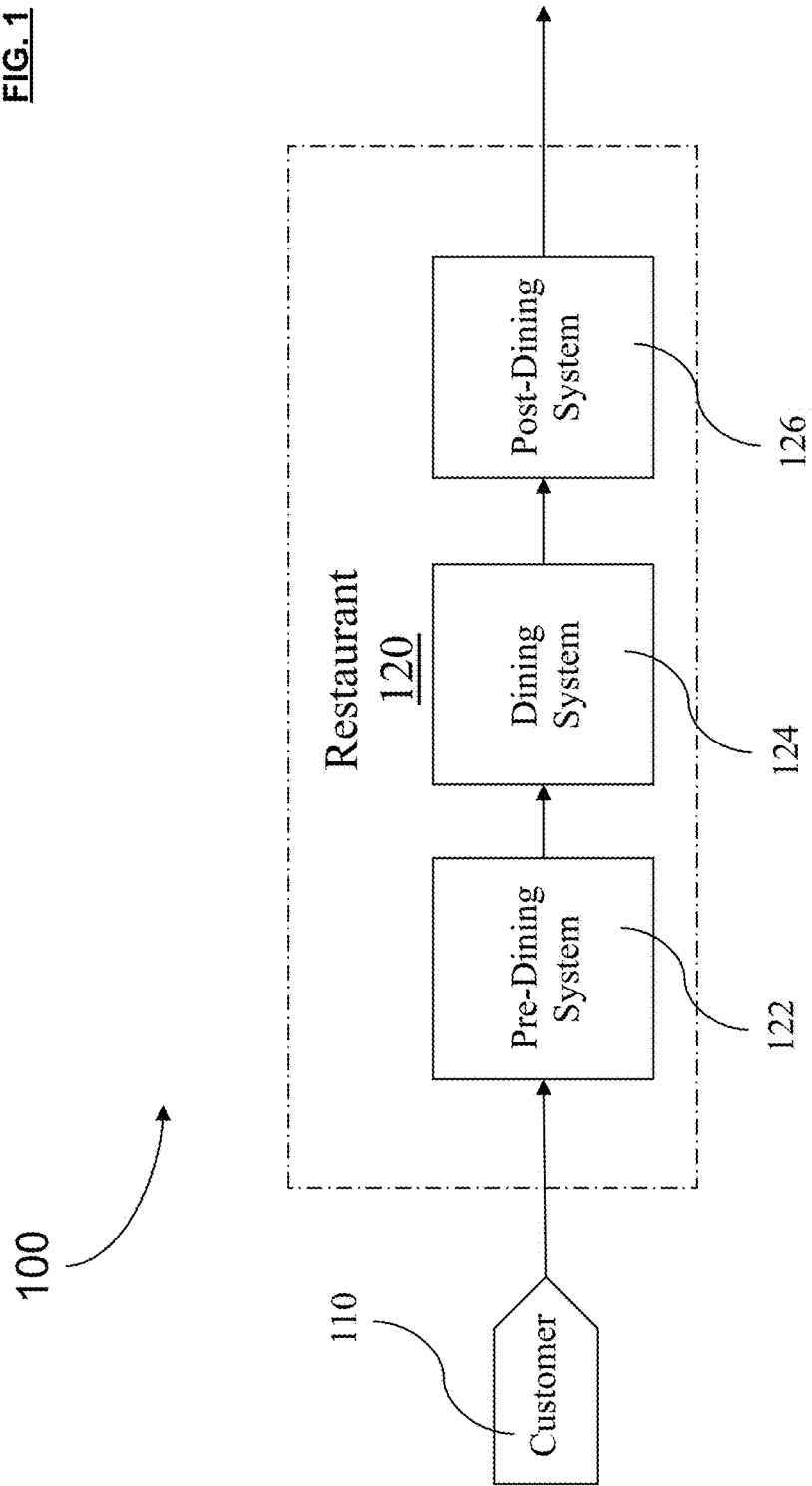
FIG. 1 illustrates a restaurant customer management system.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in § 112, paragraph 6 of 35 U.S.C., unless used as "means for —functioning—" or "step for —functioning—" in the Claims section.

Discussion of the Figures

The invention can be characterized as a method and system that enables a restaurant to identify a customer, collect customer data elements, store customer data elements in an electronic repository, and provide customer tracking. In addition, the invention provides customer managed food and beverage ordering, customer infotainment, customer managed payment, customer managed purchase of post-dining entertainment, and customer reporting and real time access to customer data. In a preferred embodiment, the method may be implemented as a system that identifies, stores, tracks, provides ordering, infotainment, post-dining entertainment, and reporting, in a platform such as a software program, for example. In an alternative embodiment, the method may be embodied as multiple software systems that work together to identify, store, track, and provide ordering, infotainment, payment, and post-dining entertainment, and reporting.

Features and advantages of the invention can be better understood by reviewing FIG. 1, which illustrates a restaurant customer management system 100 that identifies a customer, collects customer data elements, stores customer data elements in an electronic repository, provides customer data element tracking, a customer managed ordering means, infotainment, a customer operated payment means, customer ordering of post-dining entertainment, and customer reporting and real time access to customer data elements. The restaurant customer management system (RCMS) 100 comprises at least one customer unit 110 and a restaurant 120 having at least a pre-dining system 122, or a dining system 124, or a post-dining system 126.

A single piece of data is a data element, such as a surname, a phone number, a beverage preference, a desert preference, or an entrée preference for example. A collection of data elements are a record. A data element that has been adapted, modified, processed, or queried is a data element result, such as a report that illustrates a list of family surnames that prefer a beverage type, for example.

The customer unit 110 is any person that requests at least one service at a restaurant 120 such as a reservation, food and/or beverage service, or entertainment, for example. Preferably, a customer unit 110 is a collection of people such as a family, a group of friends, a group of business colleagues, or a group of co-workers, for example. People include children and adults.

The restaurant 120 is any entity that provides food, beverage, and/or entertainment services to a customer unit 110. Restaurants may be sub entities in hospitality institutions, however, are more commonly embodied as curb side, brick and mortar establishments. Hospitality establishments include, but are not limited to, hotels, casinos, resorts, and cruise ships, for example. Restaurants are companies that are owned by a single owner or multiple owners. Restaurants may be individual establishments or establishments that are part of a group, family, franchise or chain.

In a preferred embodiment, the RCMS 100 comprises at least one customer unit 110 and a restaurant 120 having a pre-dining system 122, a dining system 124, and a post-dining system 126. Alternatively, the RCMS 100 may comprise at least one customer unit 110 and a restaurant 120 having only a post-dining system 126. In yet another embodiment, the RCMS 100 may comprise at least one customer unit 110 and a restaurant having a pre-dining system 122 and a post-dining system 126. It is apparent to those skilled in the art that the RCMS 100 may include various combinations of systems.

The pre-dining system 122 is any system that identifies a customer unit 110, manages reservations, manages queue assignment, pages a customer unit 110, and updates a table management system. In a preferred embodiment, customer unit 110 identification is accomplished by the customer unit 110 logging into the RCMS pre-dining system 122 by a credit card upon arrival at the restaurant 120, preferably via a handheld terminal device. Customer identification may be alternatively accomplished via other identification information devices such as an RFID tag, fingerprint or retina scan, or by logging in with a user name and password.

Terminal devices may include handheld computers, such as Personal Digital Assistants (PDAs), palm-sized and clam-shell computers, for example. In addition, terminal devices include smart phones, mobile phones, wrist PDAs, thin clients, kiosks, tablet computers, desktops PCs, internet appliances, and other device know to those skilled in the art, for example. Terminal devices may be wired or wireless enabled.

Once logged into the pre-dining system 122, a customer unit 110 record is managed through a seating queue assignment. The queue assignment provides estimated wait time and pages a customer unit 110 when a table is ready. Furthermore, the table management system (TMS) is updated with the customer unit 110 table location and the customer unit 110 is removed from the seating queue.

Alternatively, customer unit 110 identification may be accomplished by the customer unit 110 announcing themselves to a Maitre d', swiping a smart card, credit card, or VIP card, or logging in using a keypad or touch screen into the restaurant customer management system via a kiosk, smart phone, mobile phone, or automatically being identified by other means such as Radio Frequency ID (RFID), retina or fingerprint scan, or voice identification.

The dining system 124 is any system that provides an interactive menu, restaurant staff paging capabilities, meal preparation time estimates, and infotainment. In a preferred embodiment, the dining system 124 is operated by the customer unit 110. Interactive menus are provided that include food and beverage items currently available based on the time of day, such as breakfast, lunch, or dinner, among other inputs such as current product inventory, for example. In addition, restaurant staff may be paged by a customer unit 110 as needed. Furthermore, meal preparation time estimates are reported from a kitchen management system (KMS) to the terminal device, such that the customer unit 110 may track the amount of time remaining before their meal arrival. Lastly, infotainment may be provided while the customer unit 110 is waiting for his or her meal, such as interactive games, live internet access, and email, for example.

The post-dining system 126 is any system that provides customer self-checkout and payment processing, post-dining surveys, advance purchase of post-dining entertainment, customer unit 110 profile updating, and loyalty rewards. In a preferred embodiment, the post-dining system 126 is operated and managed by the customer unit. An itemized bill is presented to the customer unit 110 that may be retrieved from the restaurant Point of Sale (POS) terminal. The customer unit 110 may choose to split the bill between others or the customer unit 110 may pay for the bill in full. Gratuity may be added manually or by selecting a predefined percentage from a drop down list via a graphical user interface software system. In addition, the customer unit 110 may pay for the bill using a credit card, smart card, ATM card, or other means such as cellular phones or RFID systems that are linked to payment facilities of the customer unit, for example. Furthermore, a card reader and/or other readers such as RFID may be directly integrated within the terminal device. Digital signature capture is used to close the transaction.

The customer may complete a post-dining survey regarding the food, facilities, staff, or restaurant atmosphere, for example. The customer unit 110 may also purchase in advance a post-dining entertainment unit such as movie ticket, for example. The meal receipt, movie receipt, movie tickets, and loyalty rewards print after the customer profile is updated. Loyalty rewards may include, a free desert at an affiliated restaurant, a free beverage at the current restaurant, or a discounted movie ticket at a nearby theater, for example. A customer profile may be updated with a new phone number, email, or street address, for example.

The restaurant 120 stores all of the customer unit 110 selections, or data elements, collected through the pre-dining, dining, and post-dining system in a RCMS 100 database. Databases may include software systems such as Oracle, Microsoft SQL Server, or DB2, for example. In addition, each customer unit 110 data element is tied to a customer unit 110 record that the restaurant 120 may evaluate to improve service, offer discounts, or promote advertisements. The restaurant 120 may evaluate customer records, by reviewing reports that list data element results. Furthermore, a restaurant 120 may share data element results with other restaurants or consumer preference agencies.

Figure 2:
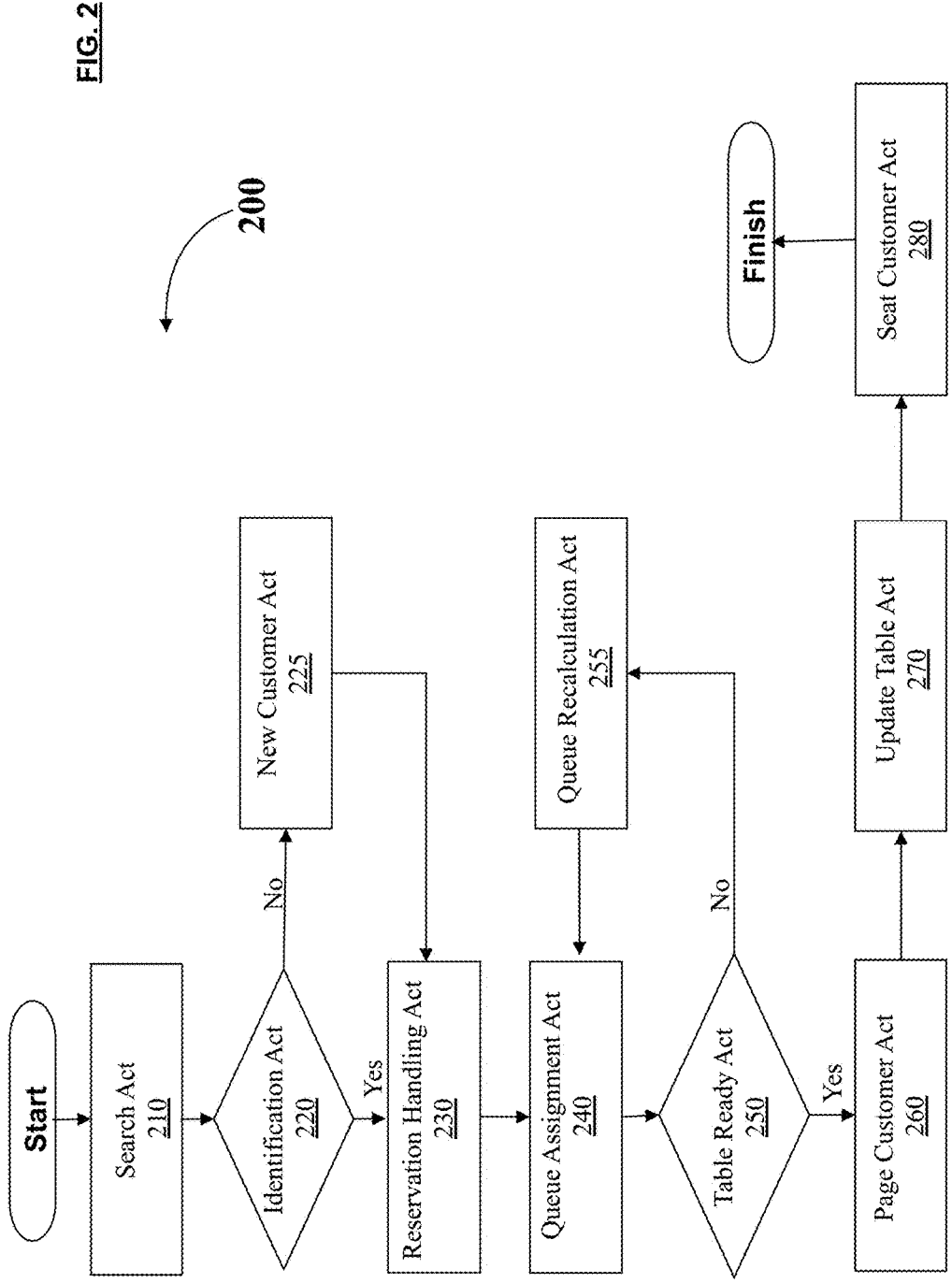
FIG. 2 illustrates a pre-dining method.

FIG. 2 illustrates the pre-dining method 200. In a preferred embodiment, the customer initiates this process by searching for a restaurant via the search act 210. The customer may choose to search for a restaurant by reviewing a list of restaurants online or via a telephone book. Alternatively, the customer may select a restaurant from memory based on a past experience. In yet another embodiment, the customer may log into a special web portal providing a list of restaurants based on a set of preferences.

Once the customer arrives at the restaurant selected, the RCMS identifies the customer through an identification act 220. The identification act 220 searches for a unique customer record data element, or key, in a database system. The key may be a phone number, surname, or credit card number for example. If no key is found, a new key is created and tied to the customer through the new customer act 225.

If a key is present and tied to an advance reservation, a reservation handling act 230 notifies a queue assignment act 240 that a customer with a reservation has arrived and is ready for a table. The queue assignment act 240 places the customer on the waiting list and queries if a table is ready, through a table ready act 250.

If a key is present and not tied to an advance reservation, the reservation handling act 230 notifies the queue assignment act 240 that a customer without a reservation has arrived and is ready for a table. The queue assignment act 240 places on the waiting list and queries if a table is ready, through the table ready act 250.

In a preferred embodiment, if a table is ready, the table ready act 250 will proceed to a page customer act 260, whereby the waiting customer is paged and notified that a table is ready. In one embodiment, the page could be sent to the customer unit's mobile pager or a phone call could be originated to the customer unit's mobile telephone when the estimated queue period drops to a time either pre-set, or based on intelligent information such as the customer's current location gathered electronically via the Global Positioning System, the mobile telephone positioning network, or other techniques. The location information may be incorporated with other pertinent information as input to the queuing system to estimate the time it takes for the customer to return to the restaurant location and be on time when their reservation reaches the top of the queue.

If a table is not ready, a queue recalculation act 255 recalculates the estimated wait time. Once a customer is paged via the page customer act 260 and the page is accepted, the table management system (TMS) is updated and the customer is assigned to an empty table via a update table act 270. The customer is then directed by the host or Maitre d' to the ready table, via a seat customer act 280.

Figure 3:
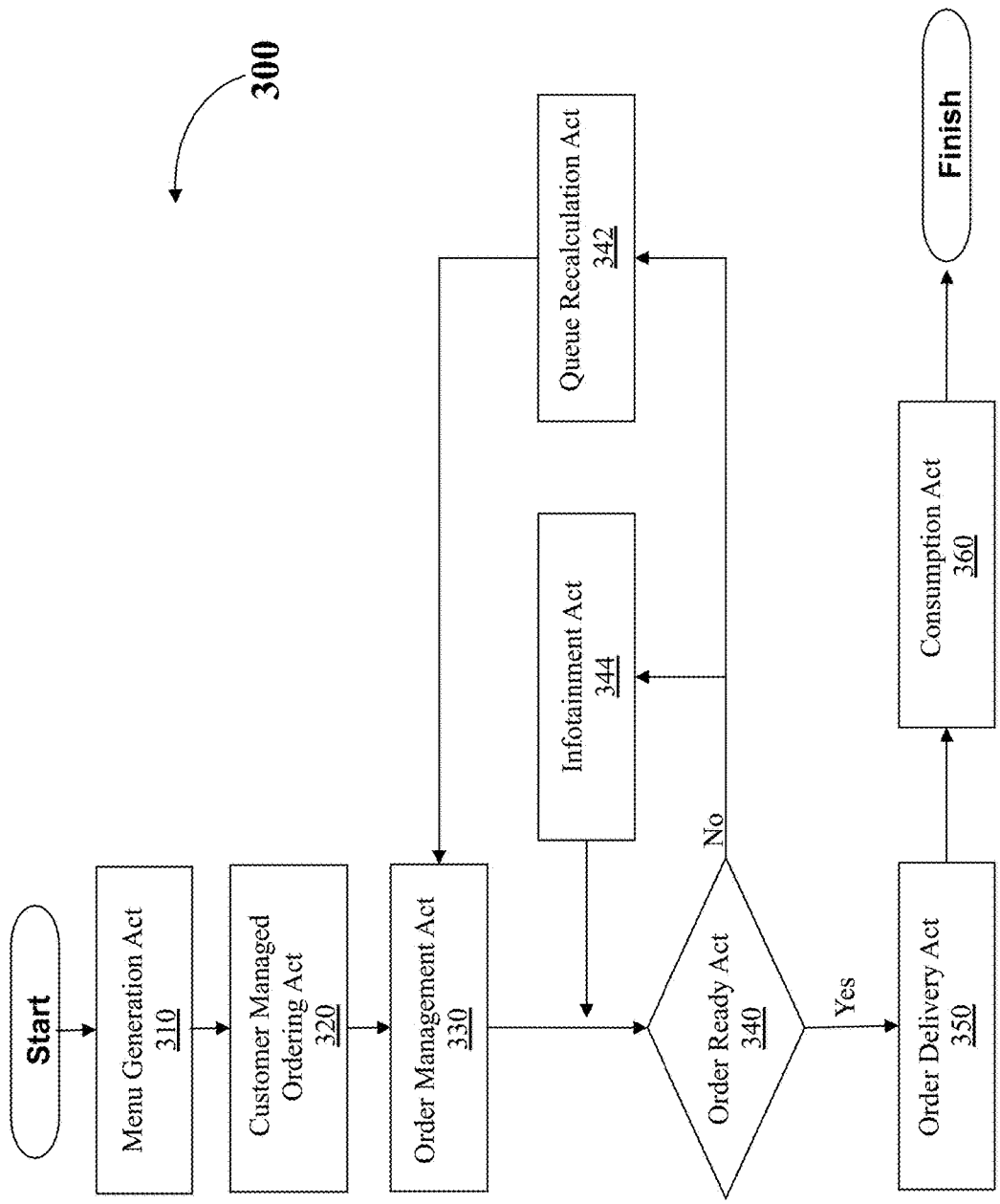
FIG. 3 illustrates a dining method.

FIG. 3 illustrates the dining method 300. In a preferred embodiment, once the customer is seated the dining method 300 is initiated. Preferably, the dining method 300 is managed by the customer on a wireless enabled handheld computer. Once the dining method is initiated an interactive menu is provided to the customer. The interactive menu may be customized based on data elements collected about the customer on previous visits, such as preferences, for example, or based on the time of day (breakfast, lunch, or dinner). The interactive menu is pushed to the customer's terminal device via a menu generation act 310.

In a preferred embodiment, a menu generation act 310 occurs when the customer is being directed to their seat. The interactive menu is generated such that it may be subdivided into two sections. The first section may provide a list of previously ordered food and beverage items or recommended food or beverage items based on customer preference. The second section may provide a list of menu items based on the time of day. The interactive menu is sent wireless to a handheld computer for customer review. In an alternative embodiment, a terminal device integrated within a table may display the menu.

Once the customer has reviewed the menu, he or she will manage the ordering process via a customer managed ordering act 320 by placing a food and or beverage order directly to the kitchen order system (KOS). This is accomplished by selecting menus items on the terminal device and submitting the order. Each menu selection is customer data element that is stored in the RCMS database along with the customer record.

Once the order is submitted, the KOS manages the meal preparation and inventory management through an order management act 330. In addition, the KOS tracks preparation time for each menu item and estimates completion time. In one embodiment, preparation time may be tracked utilizing RFID tagged plates or glasses that move from station to station. Furthermore, the total preparation time may be stored in the RCMS database such that it may be queried to improve meal preparer performance or to more accurately calculate meals requiring more preparation time, for example.

The KOS is continually queried by the order management act 330 to determine if a meal or collection of meals is ready. If a meal or collection of meals is not ready KOS provides feedback to the order management act 330 via an order ready act 340. Furthermore, a queue estimate recalculation act 342 is initiated and a new time estimate of when a meal or collection of meals is estimated to be ready is displayed to the customer. Simultaneously, through this process, the customer may be entertained via an infotainment act 344. The infotainment act provides subscription and non-subscription based entertainment services such as games, music, streaming video, and internet access, for example.

If a meal or a collection of meals is ready, the order ready act 340 initiates an order delivery act 350 that pages a restaurant staff member to deliver the food and/or beverage items to the customer table. Once the food is delivered the customer consumes the food and beverage through a consumption act 360.

Figure 4:
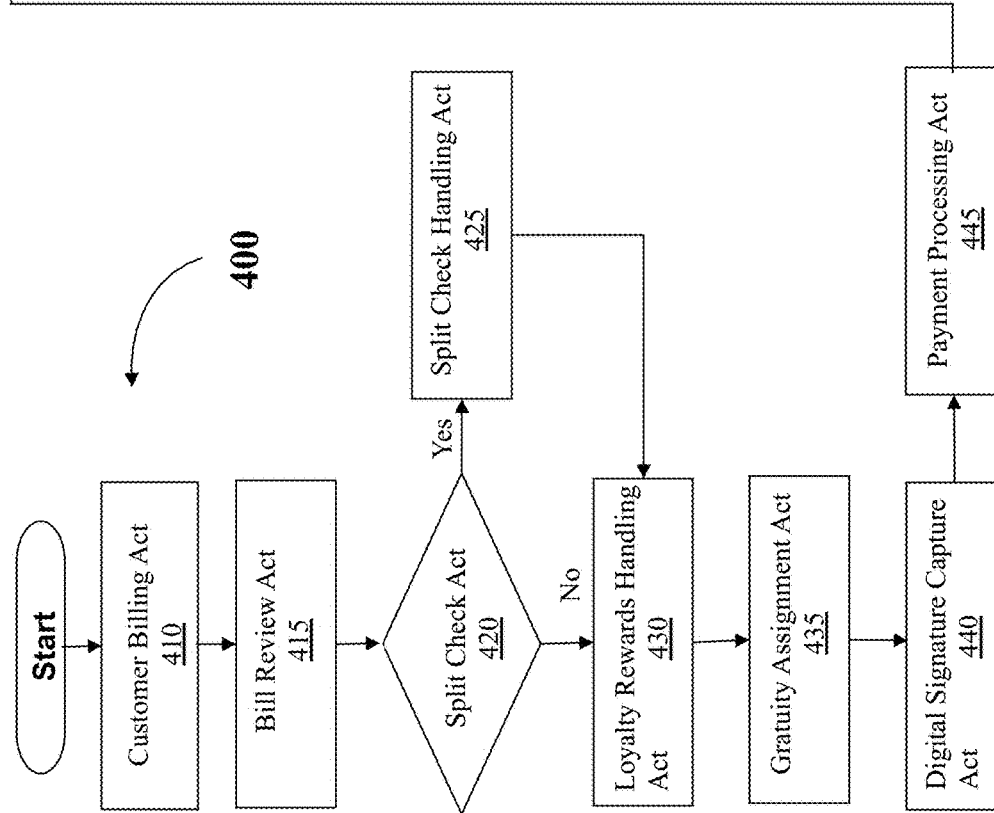
FIG. 4 illustrates a post-dining method.

FIG. 4 illustrates a post-dining method 400. In a preferred embodiment, the post-dining method is initiated when the consumption act 360 is complete. Upon initiation of this method, a customer bill act 410 notifies the RCMS that the customer is ready to checkout. The RCMS then informs the point of sale (POS) system to upload the bill to the customer terminal device. Once the bill is received the customer reviews the bill via a bill review act 415. After the customer has reviewed the bill, a split bill act 420 allows the customer to split the bill between other people at his or her table. If a customer decides to split the bill, various options are present via a split bill handling act 425 otherwise, loyalty rewards, such as coupons, are requested via a loyalty rewards handling act 430. The loyalty rewards handling act 430 deducts coupons or other promotions from a customer bill.

Once the loyalty rewards handling act 430 is complete the customer may add gratuity via a gratuity assignment act 435 thus enabling a customer to pick from a list of pre-defined gratuity percentages or allowing a customer to manually add a gratuity of their choice. The gratuity assignment act 435 performs the calculations for accurately including percentages and addition. After the customer has completed the gratuity assignment act 435, payment means is selected. Payment means may include, cash, check, a money order, a cashier's check, a traveler's check, a gift card, a smart card, a bank card, an ATM card, a VISA®, MasterCard®, Discover®, or American Express® credit card, RFID payment systems, cellular phone payment systems, or an online payment service, such as PayPal™, account number, for example. After the payment means has been selected the customer approves of and completes the transaction, via a digital signature capture act 440. Once the customer's digital signature is captured the payment processing begins, via a payment processing act 445.

During the payment processing act 445, the appropriate systems are contacted in order to complete the transaction and payment is transferred from the customer to the restaurant which may include automatically closing out the transaction in the restaurant Point of Sale (POS) system such that the restaurant staffs need not to be involved. After the transaction is complete, the digital receipt is stored in the RCMS database via a digital receipt storage act 450 and a copy prints from the terminal device for the customer via a customer receipt act 455.

Once the customer receipt is printed, a survey is presented to the customer via a post-dining survey act 460 that questions the customer about the dining experience. The survey responses are data elements that are stored in the RCMS database for evaluation by restaurant staff and management. In a preferred embodiment, survey completion is required. In an alternative embodiment, the survey may be bypassed. Completing a survey may contribute to a customer's loyalty reward assignment.

After the survey is complete, the opportunity to purchase a post-dining entertainment unit in advance is presented to the customer via a post-dining entertainment act 465. The customer may purchase the post-dining entertainment unit directly from the terminal device. The post-dining entertainment unit may be provided by restaurant partners or affiliates.

Once the customer selects an activity the transaction may be completed. A digital signature is required, payment is received, a receipt is printed, and other items confirming the transaction, such as movie tickets, for example, are printed. The post-dining activities the customer selects are data elements that are stored in the restaurant customer management system database that may be reviewed by the restaurant, restaurant affiliates, or partners, for example. In the preferred embodiment, the restaurant will receive a portion of the sale as revenue to the establishment.

Upon completion of the post-dining entertainment act 465, the customer profile is updated in the restaurant customer management system database. All data elements collected during the dining process are stored accordingly with the customer record via a profile updating act 470. Once completed, the RCMS provides loyalty rewards via a loyalty rewards assignment act 475, based on criteria stored in the RCMS database. In a preferred embodiment, the customer is presented with a selection of reward options. The customer chooses a single option and that option is printed by the terminal device. After the loyalty reward assignment act 475 is complete, the post-dining method 400 is complete and the customer may leave the restaurant when ready.

In an alternative embodiment, the customer may receive the menu payment receipt after the loyalty reward assignment act 475. In yet another embodiment, the menu receipt, the entertainment purchase receipt, movie tickets, and loyalty rewards may all be printed on one receipt following the reward assignment act 475. It is apparent to those skilled in the art, that a receipt for any transaction may be presented immediately after a transaction is completed or at the end after all transactions are completed.

Figure 5:
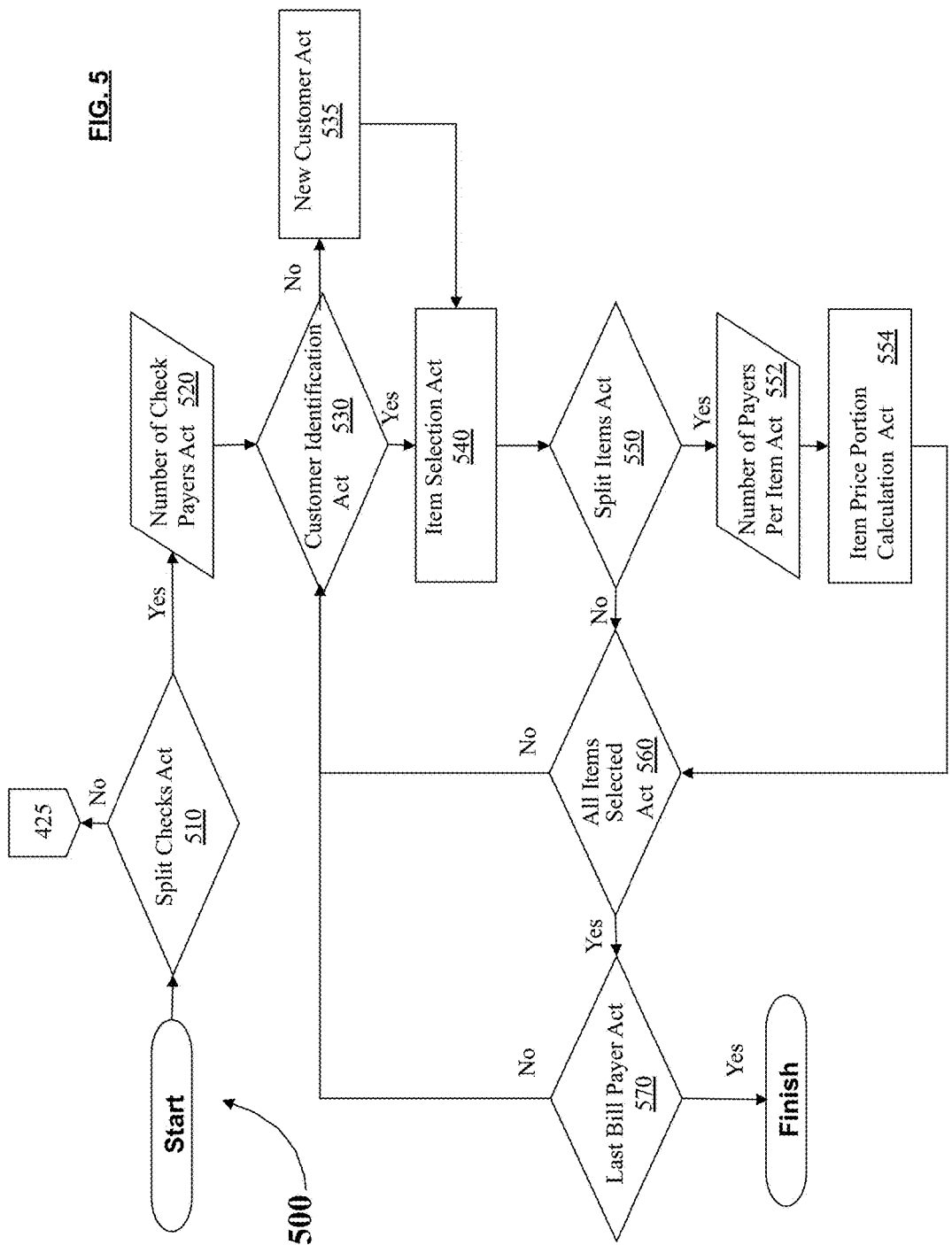
FIG. 5 illustrates a post-dining method spilt bill act.

FIG. 5 illustrates the details of the split bill handling act 500 of the post-dining method. In a preferred embodiment, a split bill act 510 is initiated after the customer reviews the bill, in a bill review act 415 (FIG. 4). If the customer decides not to split the bill, the split bill act is bypassed and the customer proceeds to a loyalty rewards handling act 430 (FIG. 4).

If the customer selects to split the bill the customer is provided the option by the split bill act 510 to manually subdivide the bill evenly between people, by person, or subdivide an item by a number of people paying. Once a customer decides to split the bill, the number of people paying at the table is identified through a number at table act 520. In a preferred embodiment, the first customer would select the number of people that are dining at the table. The first customer proceeds through the process and is identified through a customer identification act 530, whereby the customer is tied to a unique customer record in the RCMS database. If no record is found, a new record is created via a new customer act 535.

Next, the first customer selects items for which they are to pay for via an item selection act 540. In one embodiment, the item selection act allows the customer to drag items to a box that represents his or her place setting at the table. It is apparent to those in the art, that alternative graphical representation may be implemented to accomplish the same task utilizing various graphical user interface software systems.

After the first customer selects all items for which they are to pay for, the first customer may then further divide a food or beverage item between themselves and other paying customers sitting at the table. For example, the first customer may have shared an appetizer with a second customer. The first customer and second customer agree to split the cost of this food item. In a split item act 550, the first customer may designate that the food item is shared between the first customer and the second customer, via a number per item act 552 and the food item cost is automatically split via an item portion calculation act 554 and the payment amount due appears on the first customer's bill. If the customer does not select to subdivide a food item, the process proceeds to an all items selected act 560.

Once the first customer selects all items that he or she is to pay for and is complete with splitting the bill, the customer proceeds to a loyalty rewards handling act 430 (FIG. 4) and continues to proceed until completing the loyalty rewards assignment act 475. If the first customer is not the last customer to pay the bill and a balance remains, a last bill payer act 570 is triggered and returns to a customer identification act 530, however, the first customer is marked as paid on the table list, their individual bill is marked closed, and their expenses are removed from the bill balance. If the second customer, or other subsequent customer, is the last customer to pay the bill and no balance remains, the split bill handling act 425 method loop is terminated and a thank-you message may appear on the terminal device display.

Figure 6:
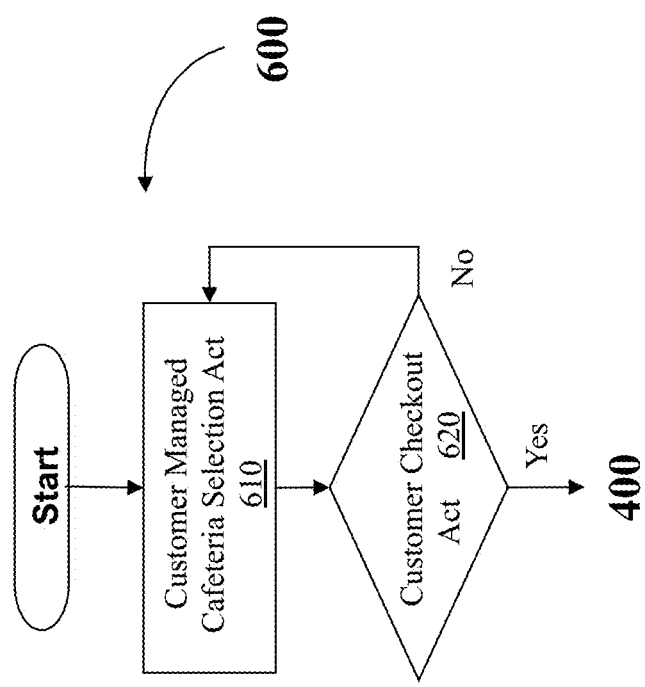
FIG. 6 illustrates a cafeteria method.

FIG. 6 illustrates a cafeteria dining method 600 whereby a customer unit may walk along a cafeteria line, in a cafeteria type establishment, and select food and beverage items of choice. In one embodiment the customer unit takes their own food and/or beverage items from a counter top via a customer managed cafeteria selection act 610. The customer unit may return to the cafeteria line as often as they wish to select items. Once the customer unit has selected all items of choice the customer unit pays for all items via a customer checkout act 610

In a preferred embodiment, the customer checkout act 610 enables the customer unit to pay for items selected thru a customer managed payment system, such as a wireless enabled handheld computer having a graphical user interface that allows the customer unit to identify items selected and pay for the selected items via the method described in the post-dining method 400 (FIG. 4).

In an alternative embodiment, cafeteria items such as trays, plates, and glasses may be tagged with RFID tags. As the customer unit selects items from the cafeteria line, a terminal device, identifies and tallies all the items the customer unit has selected utilizing RFID. Once all items are selected the customer unit may pay for the items via the post-dining method 400 (FIG. 4).

In yet another embodiment, a customer unit may identify themselves to a system using a customer identification means, such as a credit card or RFID tag, for example. Preferably, all food and beverage item plates and glasses are RFID tagged. As the customer unit selects an item, the item is added to their selection list automatically as the remove an item from the counter. In addition, to prevent theft items may only be removed from the counter after the customer unit is associated with an item. One methodology of preventing theft is a security means that uses serving dishes containing metal which are held by an electromagnet, until a customer unit and item association is made. Another security means that may be used is a physical barrier such as a glass door, for example, which will prevent a customer unit from taking an item until the customer unit and item association is made.

As described, the invention describes new concepts, methodologies and capabilities associated with the hospitality industry, in particular the restaurant and food service industry, for supporting customers transacting with an establishment via customer-managed processes and technologies.

These concepts, methodologies and capabilities include but are not limited to the following:

The system and methodology for customer handled reservation management

The system and methodology for integrating Queuing systems, Table Management Systems and POS Systems for improved restaurant queuing time estimates The system and methodology for customer managed ordering and the integration with Central Management Systems, Kitchen Management Systems, POS Systems and Table Management Systems, among other systems within the environment Customer managed self-checkout process and methodology including components related to the digital signature capture and back-office systems integration and management The methodology for other types of self-checkout process such as for cafeteria style dining.

A programmable SDK (Software Development Kit) for managing menus, billing, infotainment facilities, among other capabilities.

The system and methodology for tracking and reporting meal preparation time estimates using RFID and other identification methodologies and technologies The integrated characteristics for customer managed devices, including devices for reserving, ordering and paying.

Business Models for developing, deploying and managing the inventions in commercial industry.

Overview

The restaurant and hospitality industry is rapidly changing as a result of the change in demographics of the customer base and the introduction of technology. The traditional experience in which a customer partakes when dining out is the same model that has been employed for hundreds of years.

However the next generation of restaurant customers (and operators) are from Generation X—these customers are generally educated, highly competent with technology, consider time as a valuable commodity, often impatient, and enjoy continuous and interactive entertainment.

In order to serve this next generation of customers and operators, new methodologies for managing the customer experience are required to meet the changing needs. In essence, this can be described as a new customer experience for dining out.

This invention describes new concepts, capabilities and methodologies for a customer-managed dining experience.

Concept and Methodology

The vision of the new experience is an end-to-end process focused on simultaneously improving customer satisfaction and operator efficiency in which the customer experience and interaction can begin well before they arrive at the restaurant, to well beyond the point at which they actually depart the premises.

The restaurant industry has been using a suite of disparate technologies to solve a variety of operator related issues. The concept and methodology described herein integrates the various technologies into a single comprehensive solution combined with additional capabilities aimed at improving the customer experience, while putting a portion of the technology solution into the customer's hands.

The new methodology addresses three distinct but related phases of the current dining experience:

Pre-dining and Seating Phase

Order, Wait and Consumption Phase

Payment and Post Dining Phase

Identification

The methodology for the customer to identify themselves to the system and ultimately to the establishment and its employees is a factor in improving customer satisfaction by delivering a personalized experience.

Key to the methodology is that the end to end dining process is linked together such that a customer's identity is maintained throughout the entire process. This can be referred to as the Identity process. This implies that the customer is identified to the Central Management System and the restaurant at the first instance of entering the dining process, and all events that occur throughout the experience are tied to the identity. Note that the dining process or dining event refers to any period, not necessarily dinner. The dining process or event can equally refer to breakfast, lunch or other periods.

A customer might enter the process when they, for example, log into the system to make reservations, or when they arrive at the restaurant and announce themselves to the Maitre d' to be manually placed on a waiting list, or when they arrive at a restaurant and announce themselves to an automated machine by, for example, swiping their credit card as an identity mechanism or using other identity technologies such as RFID, Retina Scan or other means.

The implication of a customer's identity being maintained throughout the entire process is that a customer that is waiting in the bar and, for example, purchases drinks, will not necessarily have to close their tab at the bar when their table is called for seating. Instead, the information of the bar tab is tied to the customer's identity and is transferred to the next event, i.e. the meal ordering phase, and follows the customer until the end of the dining process. Should the customer choose to purchase movie tickets from the restaurant for a showing after the meal is to be over, this event could also be included as part of the process and linked with the customer's identity.

Process Periods

Depending on the type of events, there are several different process end points. From a billing perspective, the process end point usually ends when the customer is ready to leave the establishment and has closed down all tabs for that time period, e.g. lunch or dinner. However if the customer has further activities that will be pursued that are purchased during the dining event, e.g. purchasing movie tickets for a showing following the meal at a nearby theatre, then the event may not end until after the subsequent event (i.e. the movie). This can be facilitated by the restaurant having a promotional agreement or arrangement with the movie theatre. However it is typical that the billing process end points are defined with the event associated with the entity that receives the settlement.

While a process end point for billing purposes likely ends with the period of the visit to the establishment, other processes continue to live. For example, when the customer closes their tab and leaves the establishment, the information of events including what was purchased, how many participants, the time of day, customer feedback etc. are recorded as part of the customer's profile in a separate process that will continue to live. This process could be resurrected at a subsequent visit to the same establishment by the customer at a later date, and would be used to improve the customer experience in various manners. For example the system can recall what the customer purchased during the last several visits, and draw on that information to identify selections that would likely appeal to the customer for the current visit.

This process can also be used for aggregating information related to the overall patronage of the restaurant rather than just on a per customer basis, in order to identify macro level information about the restaurant, including for example what meals were most popular on a particular day at a certain time by a certain demographic. There are endless possibilities of what can be compiled from the data associated with this process.

I. Pre-Dining and Seating Phase

During the Pre-Dining and Seating Phase, the following capabilities are supported according to the new methodology:

Customer Identification
Customer Preferences Handling
Advance reservations
Queuing system integration & real time estimation
Table Management system integration The experience begins with a search for an eating establishment that meets the current needs of the customer. The customer can, for example, review a list of restaurants by logging in to the Internet and using a search engine or other method for identifying a suitable location such as a specific restaurant site on the World Wide Web as a resource.

By logging into a web portal, a customer's profile can be used to aid in identifying an appropriate match. This would take into account the customer's personal preferences, location and proximity, estimated time for the dining event, correlation with pre and post dining events that the customer has scheduled (e.g. movies, meetings, etc.) via integration with a Personal Information Management system such as Microsoft Outlook. Logging into the system can also be used as an identity mechanism for the system, which could represent the first point of entry into the Unified Process.

With this information in hand, the customer can automatically make and confirm reservations online with the restaurant by, for example, viewing the available timeslots at a particular restaurant and selecting an available slot. These actions could be taken without intervention or interaction with a live agent such as the Maitre d'.

By the same token, the customer can perform these same functions via personal devices that use wireless technologies such as a wireless web enabled mobile telephone or a wireless web enabled Personal Digital Assistant (PDA). For example, a wireless web enabled mobile phone browser can access this information using wireless telephone information technologies such as WAP (Wireless Application Protocol), XHTML, CHTML, SMS, or other protocols and bearers (Circuit Switched Data or Packet Data) accessed via their mobile telephone. This would allow the customer to identify a suitable location while away from a fixed wire device such as a computer.

Real-time Queuing Status

Whether at a fixed wire computer or mobile with a wireless device such as a wireless web enabled mobile telephone or PDA, a customer could also view the real-time status of a restaurant's queue by checking the information which would be calculated based on information acquired from the current events in the establishment and accessed by the customer on the web via a fixed wire computer or a mobile device such as a mobile telephone or PDA wherever they are currently located.

Currently queuing information in restaurants is often estimated by a person such as the Maitre d' or table host that is managing a manual list. Typically the process is such that a table is identified as being free and available by the server responsible for that table only when that server has identified the table as being ready to clear following the departure of the party. In that case, the server physically must signal to the table host, who is often in a different location from the table, once the table has been cleared and prepared for the next party.

Using a host of technologies, the queuing time estimate for a particular guest to be seated can be significantly improved in terms of accuracy. This will allow guests to better prepare and make use of the time they spend waiting, which will contribute to improved customer satisfaction.

The methodology for deriving the queuing time estimate typically can incorporate information from all or some of the following systems: The Central Management System; the automated online Reservation System, the Table Management System, the Point of Sales system, the Kitchen Order Management System and the Payment system.

By combining the input from these various systems into a dedicated Queuing Estimate System along with additional information including historical estimates gathered from previous sessions, time of day, individual party size, number of particular table styles (for example two person square tables, six person round tables), external factors such as local weather, traffic, construction, events such as conventions or public holidays, among other inputs, a highly accurate queue estimate can be calculated that can be given to a specific customer or party.

Typical examples of the inputs to the Queuing System from other systems might include the following:
- Historical information might show that lunchtime business peaks between 11:18 and 13:20 on Wednesdays during the month of September in which there are no civic holidays.
- Time-slot reservation inputs from the Reservations System including reservation removals for parties that have been served or have been cancelled or rescheduled.
- POS system reporting to the Queuing System containing status of each customer order being recorded and then forwarded to the kitchen for preparation.
- Kitchen Order Management System information identified to the Queuing System containing the current rate of orders being managed, including whether or not there is a slowdown due to various circumstances.
- Customer managed Tableside Payment system triggers to the Table Management System when a customer has finished reviewing their bill, has swiped their credit card, and has closed their transaction.
- At that point the Table Management System would input this information to the Queuing system for further refinement of the current customer queue times.

The computational analysis to derive the actual queuing time figure uses various mathematical formulae based on standard queuing theories and techniques, with additional provisions for incorporating learning capabilities for continuous refinements as the system continues to collect data throughout its lifetime.

During the time that the customer waits for their turn for seating to arrive at the top of the queue, the system continues to refine its estimate based on the current data. As a result, an initial estimate of fifteen minutes may in the end require either more or less time to reach the top of the queue in light of real-time changes in the inputs from the various systems and external factors.

The calculated queue time for each individual customer or party is continuously calculated in real-time, and is different for each individual customer or party based on their profile. For example a party of six may have a queue time that is longer than a party of two as there are typically less tables in a restaurant that is capable of supporting a party of six than there are tables that can support a party of two.

The customer can at any point verify their current real time queue estimate using a variety of techniques. The restaurant establishment could provide the customer with a device that identifies this information via, for example, a wireless connection to the Queuing System. Alternatively the information can be published for all customers to view on, for example, an overhead television or dedicated data screen. A customer could verify the information from a mobile device such as a mobile telephone or data enabled device such as a PDA. To elaborate, a data enabled mobile phone could access the information using, for example, a WAP browser with which the customer could query the Queuing System. Alternatively the customer could call into an IVR (Interactive Voice Response System) or VoXML (Voice XML) system to query the same data.

By the same token, rather than have the customer originate a query, it is possible for the system to inform the customer directly when events are triggered. For example, a page could be sent to the customer's mobile pager or a phone call could be originated to the customer's mobile telephone when the estimated queue period drops to a time either pre-set, or based on intelligent information such as the customer's current location gathered electronically via the Global Positioning System, the mobile telephone positioning network, or other techniques. The location information would be used along with other pertinent information as input to the queuing system to estimate the time it would take for the customer to return to the restaurant location and be on time when their reservation reaches the top of the queue.

As a result, it is not necessary for the customer to wait on-site at the restaurant to maintain their position in the queue.

When a table is available and prepared, the customer's queue time is reduced to zero. The customer can be informed using a variety of techniques including:
- An aural announcement by the table host or Maitre d'. The table host cannot be sure that the party has been informed until the party identifies themselves to the host, which can result in delays that will ultimately affect the queue times for other waiting parties.
- A restaurant owned paging device that has been distributed to the customer and that can be triggered by the host and relayed via wireless techniques to the device. Using such a device can reduce the time for a party to identify themselves as the method implies a higher level of probability of success in informing the customer.
- A personal device owned by the customer that can be paged or alerted by the Queuing System. For example, the Queuing System could originate a phone call to the customer's mobile telephone or a page to the customer's pager, or a mobile data message such as an SMS or WAP Push message to the customer's mobile data device.

II. Order, Wait and Consumption Phase

The following functions are performed during the Order, Wait and Consumption Phase:
- Ordering capabilities—only items currently available will be uploaded and displayed to be ordered (based on time of day e.g. lunch/dinner menu, and inventory control)
- Beverage Management—interactive beverage and wine lists
- Paging Capabilities—Customer or a device can page the server or manager using a wireless device
- Meal preparation time estimates—integration with kitchen management systems for improved real-time estimate Infotainment—while waiting for the meal to be prepared and served: Interactive games, live internet access to news, weather, sports, stocks, horoscopes, personal e-mail Once at the restaurant, the next phase begins in which the customer is identified by the system to the staff including their preferences and previous history (what they ordered on previous occasions, etc.), correlated with the reservation made on the web, and prepared for their table.

At this point the customer could choose to wait in the bar and purchase drinks which would be associated with the customer's identity as they continue throughout the unified dining process of events. When their table becomes available, they would not necessarily have to close down their bar tab, as it would follow their identity to the next event, such as the meal ordering process.

At the table, the customer will be presented with a device from the restaurant that will perform many functions. It is also possible for the customer to use their own device that interacts with the system, for example a mobile phone or personal PDA connected over the internet via wireless technology could be used to connect to the restaurant facility systems rather than the customer using the on-site device provided by the restaurant.

The restaurant device could encompass a large enough color screen that can be read at the table in place of a menu. The screen could be a touchscreen or instead another input device could be used such as a mouse or a keypad. A single device for the entire table could be used, or a separate device per person. If a single device is used, it would typically be shared by all participants, or one person would handle the processes on behalf of the party. Having one device for the party is typically more appropriate for a beverage management system such as a wine list in which a bottle is chosen for the table.

Device Display Management

In the case where individual devices are used for each customer, a physical display management system is required in which the devices can be displayed on the table, secured to prevent theft, and re-arranged easily as the tables are moved and fitted to meet the needs of varying party sizes. One methodology is to have the device be freestanding but physically secured to the table, or alternatively the device could be physically built in to the table, or the device could be physically affixed to a wall next to the table, or the device could be physically affixed to the floor next to the table. Other possibilities for physically securing the device are also possible.

Devices can be electronically connected for data management to the Central Management System via fixed wires or via wireless techniques such as radio frequency or infrared technologies.

An alternative methodology that is more flexible in terms of its arrangement would be to have a square display unit with four cradles, one at each side, which could be dynamically arranged depending on the required table configuration. In the case that a table is setup for two people facing each other, two devices could be inserted into opposing cradles of the display unit at the table. For a table of four people, all four cradles could be populated with devices. For a table of six in which two two-person tables have been combined, two display units could be linked together, which would provide six cradles to be populated with devices.

While a display unit is one methodology for securing the devices to the table, it is possible to use other means for theft prevention. For example the device could be manufactured using proprietary components and methodologies such that it would be rendered useless outside the restaurant facilities. In such a case, this fact could be clearly identified on the device as a theft deterrent.

Alternatively proximity alert devices using wireless technology could be employed in which an alarm would be signaled if a device were removed from a specific location or removed from the establishment. Tracking technologies could also be employed to track the device within the establishment or outside the establishment, using technologies such as GPS tracking.

Identification for Ordering

With the device in operation, the current and up-to-date Menu and Beverage List based on the current time of day (lunch menu/dinner menu) and current inventory status is uploaded to the customer's table. In order to upload this information of the current menu items available for sale to the terminal, the system interacts with the Kitchen Inventory System to assure that all the necessary ingredients are available before allowing it to be uploaded to the customer site. If an item is available but a particular ingredient is out of stock, the item could still be uploaded to the customer site, however the out of stock ingredient would not be included in the list of possible choices, should that be an option for that item.

If this is the first instance of the overall process (i.e. the customer has not previously registered with the system at some point whereby their identity had already been processed), then the customer must begin with an identification process in order to identify themselves to the system. This could be achieved by swiping a credit card or other identification information device such as an RFID tag, by logging in with a user name and password.

If the customer has previously logged into the system and is transferring information from a previous process connected with their identity (e.g. a bar tab), if the customer logs in again at the new location (i.e. the table), the information from the previous process would be linked to the new process going forward.

Payment Identification

If a party contains more than one person, it is possible for various methods of identification and payment. If one person is planning to pay for the entire party, that person could identify themselves to the system during the login and identification phase, and that information would be transmitted to the other devices such that it would allow them to begin the ordering process.

Alternatively each individual person can log in individually and pay for themselves, or any other combination in which, for example, couples could pay on a separate invoice. The system is entirely flexible in this manner.

If one party member chooses to pay for other party members, it is possible for the paying party member to be granted access to view the ordering information of those for whom they are paying. In this case the system may or may not identify this to the non-paying parties (i.e. that the paying party has viewing privileges), and the system may also offer the non-paying parties the option to block this capability. In the same manner, it is possible for the system to offer the paying party the privilege of managing and modifying a non-paying party's order.

At anytime during the process including at the point of checkout, the system can be made to allow the paying arrangements to be altered such that the selecting of paying parties can be altered, as well as the assignment of items purchased can be altered. The system can also make provisions for allowing individual items or the entire bill to be shared or divided in various manners. For example, a bottle of wine could be equally shared among four paying parties, or an individual party could select to pay a certain percentage of an individual item. The system is entirely flexible in its payment scheme.

Finally, it is also possible for the system to allow the ordering process to proceed without identification of the paying parties until the checkout process.

Ordering

Once logged in and identified to the system, the system can draw upon past experience of the customer or other information collected from the login process such as demographics, credit limits, etc., to intelligently present the menu and provide selections that would be appealing to the customer. The system could potentially place the intelligent selections at the front of the menu, followed by the regular menu.

Once in the menu selection process, customers will be able to easily learn about the menu item selections, and put together an order on their own. The system can highlight specials offered as well as recommend food and wine pairings.

The process for ordering and selections can be similar to an internet shopping cart. The menu items can include nested hyperlinks or other methods for drilling down for additional details to learn more about the product. For example, the main menu might contain a section on hamburgers with a list of the combinations offered, with perhaps a small picture and the price. By selecting the description or the small picture, the site would provide additional information on that item including a larger image with details.

The customer could choose to add the item to their order or return to the previous menu to continue searching for other items. Additional options for customizing an order could be provided to the customer, such as pull down menus for having specific items on the side rather than on the main course, or to substitute certain accoutrements for others from a list of choices.

If the customer chooses to order the item, they would then be returned to the main menu to continue the process of selecting items, to add for example beverages, appetizers or other items.

At any point during the shopping cart ordering process, the customer can review their order including the current addition of the item prices.

At any point the customer could then choose to confirm the order. Confirming the order would send the information of the contents of the order to the Central Management System which would pass the information to the POS System and to the Kitchen Order System to display to the meal preparers.

If the order involves items to be prepared in different facilities, i.e. the meal in the kitchen and the beverage order in the bar, the Central Management System would forward the necessary components to the appropriate facilities. The Central Management system would then keep track of the orders to manage the coordination of activities for delivery of the items to the table at the appropriate times. For example, a specific beverage could be coordinated for delivery with a specific item of the meal, e.g. a glass of wine with the main course.

Real-time Preparation Estimation Process

Once the order has been received by the Central Management System and distributed to the various facilities for preparation, information on preparation progress is input to the system to continuously refine the estimate of when the order will be prepared and ready for delivery to the table.

The actual order preparation process can be considered a project, with a defined start and end point, and a finite set of inputs and outputs. Order preparation tracking is achieved by using various technologies for tracking towards specific milestones and tollgates of the project. For example, during the preparation process, identification technologies such as bar code or RFID can be used for the items required to prepare an order. When an order is received in the Kitchen Management System, specific dishes on which the order will be placed can be assigned by the system. These dishes can contain identity tags such as RFID that can be tracked through sensors in the kitchen as the order is prepared.

The Order Management System can keep track of the dishes and record when they accomplish a particular project milestone such as being placed in a specific location such as a warming station to wait for other components of the order, or when a project tollgate has been achieved in which the order has been completed and is ready for a runner to return to collect the items to deliver to a table.

The Order Management System can report when each plate has been prepared and placed on the warming station for a particular order. When all plates in an order have been placed on the warming station, the runner is automatically paged to deliver the order.

Other mechanisms and techniques including manual input by the preparer can be used for identifying to the system when various project milestones and tollgates have been achieved in the preparation of the order.

By the same token, the customer can query the Order Management System to be able to view the status of the preparation of their order. Based on the kitchen information, the system could provide a continuously updated real-time estimate of the expected time for preparation completion and tableside delivery. The system could use a variety of inputs including time of day, number of tables occupied in the establishment, number of meal preparers on hand, current rate of order fills etc., in refining the estimate.

The customer could also be automatically alerted to this information without have to query the system themselves. The customer could subscribe to alerts from kitchen identifying, for example, when an order has been assigned to a meal preparer, when each item in an order has been started, when each item in an order has been completed and is waiting on the warming station, etc.

The customer could view this information in a special view on the tableside device at any point. A graphical timeline chart of the meal preparation process could be shown, with the current status of the process highlighted on the display.

If the preparation period exceeds specific guidelines, various flags can be raised and appropriate persons alerted in order to take action. For example, the meal preparer might be alerted that the last item for an order to be completed is taking too long while the other items wait on the warming rack. If the order continues to slip, the server could be alerted and they could personally visit the table to explain the situation. The manager could also be alerted via wireless device such as a pager, from which they could take action. At anytime during the process, the customer can page a server or manager to the table for human intervention.

Inventory Control

As the meal is prepared, ingredients are removed from the storage facilities. As they are removed, the system can be informed for inventory control purposes. For example, bundles of spinach can be wrapped with RFID tags that would be removed from inventory when they are removed from the storage facility.

In addition, the actual order information can be used for inventory control. Once an order has been completed, all the ingredients for the order preparation can be removed from inventory.

When inventory items are reduced to specific levels, an automatic Inventory Order System can be invoked in order to place an order with the supplier. This can be immediate or delayed in order to accumulate a sufficient order quantity of goods.

The inventory information is also fed back into the menu system to be reflected when uploading the latest menu to a customer table for ordering.\

Paging

At anytime during the process, the customer can page the server or manager by pressing a paging button on the device that will communicate via a wired or wireless connection to a paging device with the server or manager. The paging device typically has a wireless connection and can be worn by the server or manager. The server or manager can be alerted by audio (e.g. an alert sound), sensation (e.g. a vibration alert), and/or visual means (e.g. a light indication).

The device may also include descriptive information associated with the page, such as a request for a server to provide an support in using the system.

Paging can also be used by other devices within the establishment. For example, a beverage glass can support technology to identify when the contents of a glass have been reduced and may require replenishing. Such a beverage device could then inform the Central Management Server which would in turn page a server to deliver a refill or replenish the glass.

Infotainment

During the order preparation phase, customers are able to participate in tableside Infotainment Services via a connection to the internet including interactive games such as interactive trivia challenges (can be played solo against the computer, other participants at the same table, other participants within the same group or within the restaurant, or externally with other restaurant patrons), general web surfing, real-time information (news, weather, sports, stocks, horoscopes, personal e-mail, etc.), Instant Messaging, etc.

The connection from the device to the internet can be achieved via a fixed line connection using technologies such as xDSL, Cable Modems, T1/E1, Optical OC links, etc., via a wireless connection using technologies such as radio frequency including for example CDPD, Circuit Switched Data for TDMA, CDMA, GSM or other wireless technologies, Packet Data for TDMA, CDMA 1×RTT, GPRS, UMTS or other packet wireless technologies, Wireless LAN technologies such as 802.11a, 802.11b, Bluetooth, or Broadband Access, via point-to-point communication technologies such as infrared, or via other connection technologies.

Tableside Services

Customers can be charged for various services, including basic internet access for web surfing as well as for premium services such as an online Music Jukebox service, allowing the customer to choose music to play at the table, for which the customer would be charged. All charges are sent to the POS system to be maintained until checkout.

The system can highlight partner program offers with nearby movie theatres or dessert locations. The customer can then interact with these sites as a referred customer from the restaurant establishment. As a result, the restaurant can receive a new revenue stream based on a revenue sharing arrangement between the partners. For example, if the customer chooses to purchase a movie ticket for a showing following their dinner, the restaurant would receive a referral fee from the movie theatre.

The customer could either purchase the movie from the movie theatre site directly and have the ticket waiting for them when they arrive, or could have the receipt printed by the restaurant for the movie theatre transaction. Alternatively the customer could purchase the ticket through an arrangement between the restaurant and the movie theatre such that the movie fee would be added to the customer's restaurant bill and a receipt would be printed at the restaurant that could be used at the movie theatre. The restaurant would then settle with the movie theatre for the price of the ticket minus a service charge for example.

While surfing on partner websites, the customer could print coupons at tableside that could be used at a partner location. For example, the customer could print a coupon for a nearby dessert café which would contain a referral identity number that would be used to identify the issuing restaurant to the partner for referral payment and/or statistical purposes. Partner websites could be charged a fee for their coupons being printed at the restaurant.

From the device it would also be possible to run high bandwidth premium services such as movie clips, advertisements, news reports, horoscopes, entertainment shows, movies, and other forms of audio and video entertainment, as well as audio and video calls to other systems including the public telephone network.

The device would also offer capabilities such as an outlet for recharging a personal device such as a personal mobile telephone, PDA or other device, for which a charge could be added to the customer's bill. Other capabilities include Prepaid recharging such as for mobile phone minutes or long distance cards. The device could also act as an ATM machine including balance verification, account transfers, make payments, and withdrawals. Assuming the customer has other means of payment for the restaurant, the customer could add a cash amount to their bill which the restaurant would disburse to the customer in cash.

III. Payment and Post Dining Phase

The Payment and Post Dining Phase covers the following functions:

Customer Self Checkout & Payment Processing
Post Dining Survey
Post Dining Entertainment
Profile Updating
Loyalty reward Programming Following the meal, the customer is able to perform 'Self-Checkout' by reviewing the bill electronically, submitting their payment and ultimately closing their account on their own. At that point the customer is free to leave at will, without having to wait for wait staff to close down the account. The Central Management and Table Management Systems are automatically advised that the customer has completed payment.

The customer self checkout process begins with the customer identifying to the Central Management System that they wish to begin the checkout process. The system can operate in a Client-Server modem which then informs the POS (Point of Sale) System to upload the bill including all individual charges to the tableside device via the same techniques previously described (e.g. via a data connection that is wired or wireless).

If there are several devices used for a single party, then the entire bill can be uploaded to all devices, or the specific bills of the individual parties can be uploaded to the respective devices.

Customers in the party can then review their orders for errors, and can page a server or manager to discuss discrepancies. The bill can contain hyperlinks with explanations of the items and the purpose for the charges with details of the events.

The system can be made to allow the paying arrangements to be altered such that the selecting of paying parties can be altered, as well as the assignment of items purchased can be altered. The system can also make provisions for allowing individual items or the entire bill to be shared or divided in various manners. For example, a bottle of wine could be equally shared among four paying parties, or an individual party could select to pay a certain percentage of an individual item.

Paying parties can also be changed such that an individual previously identified as paying for the entire party can be changed to another individual or split among a group of individuals in the party. The bill of a single member of a party can be split among the remaining individuals. This can be used for a celebration in which the bill for the person being recognized is split among the attending participants.

The system is entirely flexible in its payment scheme. The system can use payment facilities such as credit cards, debit cards, electronic checks that are managed by the customer at tableside. Alternatively the system can link to other electronic payment wallets for account settlement, such as an online e-commerce payment account. In this case the customer can log into an external e-commerce payment account such as Paypal.com through the tableside device or a personal device and forward a payment to the restaurant to settle the account.

Using RFID or other electronic identity payment systems such as MobilPass, the tableside device can capture the RFID information and interact with an electronic account to settle the balance.

Using a service provider account such as a mobile telephone billing account, the customer can arrange payment to the restaurant to be made to the customer's personal service provider account.

Overlay Process

While the invention described herein outlines an encompassing solution for the dining experience from start to finish, the solution is equally applicable to addressing individual components of the dining experience, overlaying the existing procedures with one that is more efficient and contributes to improving customer satisfaction, without interfering with other components.

Overlaying or replacing the traditional checkout process with a customer managed checkout process provides significant advantages in improving restaurant efficiencies and customer satisfaction.

Figure 7:
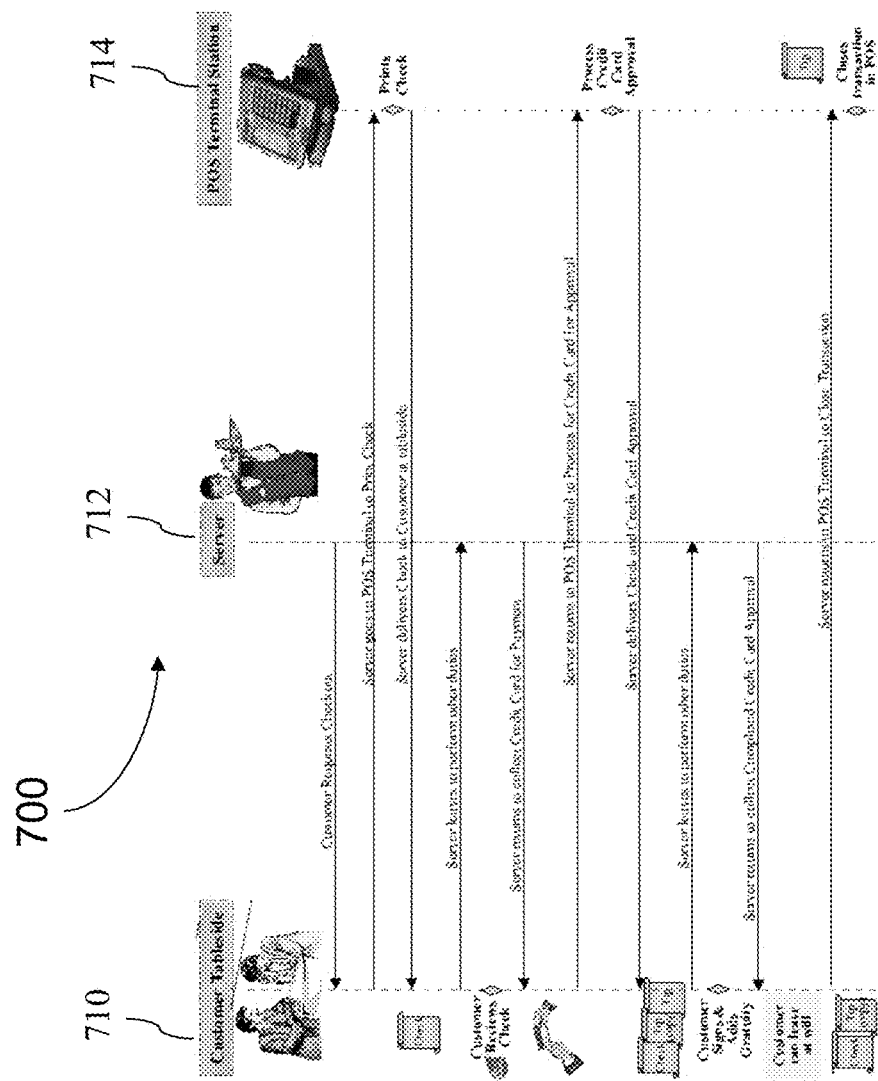
FIG. 7 illustrates a prior art checkout procedure.

FIG. 7 illustrates a prior art checkout procedure 700.

Traditional Checkout Process

The invention of customer managed checkout is based on customer dissatisfaction associated with the traditional payment process for restaurants.

One of the key issues with frequenting restaurants focuses on the customer's desire to be able to close their account and leave the establishment when they wish, without having to wait while effectively being held at the mercy of the wait staff.

This invention proposes a methodology for Customer Self-Checkout Process to address these problems in a beneficial solution for both the customer and the operator.

The traditional checkout procedure is a complicated process that requires many steps and much time, as shown in FIG. 7. As a result, the checkout procedure can quickly sour an otherwise satisfactory dining experience.

In this procedure, the customer 710 must find the server 712 to convey that they wish to checkout. The server must then physically go to a specific location to interact with the POS system 714 where the order was manually entered, as per the procedure in traditional restaurant ordering procedure.

The POS system then prints out a paper copy of the bill. The server then delivers the bill to the customer. The server can then leave the table to perform other duties.

The customer reviews the bill for accuracy. Once satisfied, the customer must find the server to submit payment. If the payment is via credit card, the server must return to the POS system for processing.

At the POS system the server commands the system to reserve a credit amount on the customer's credit card account that is in excess of the actual bill in order to cover an anticipated gratuity that will be added by the customer.

Once approved, the POS system prints two copies of paper that contain the total from the bill and a place for the customer to add a gratuity.

The server delivers the two copies of the gratuity paper along with the original paper bill and the credit card to the customer. The server can then leave the table to perform other duties.

The customer then calculates and manually enters a gratuity amount, and the customer adds the total. At that point the customer is free to leave with the original paper bill and one of the copies of the gratuity paper receipt.

The server then returns to the table to collect the remaining paper gratuity receipt and returns to the POS system to close the transaction. At the POS system, the server manually keys in the gratuity and the POS system finalizes the payment with the credit card facility with the actual amount to be paid.

Note that if there are multiple payees within a single party, the server must process all of the payees individually in the manner described above.

The above described checkout process is labor intensive and burdensome on both the server and the customer, prone to calculation errors, and leaves a paper trail of documents that both the customer and the operator must manage in order to maintain proof of the particulars of a transaction at a later point in time. For the operator, this can be a difficult task maintaining receipts for each transaction, and even more difficult to identify a particular receipt in the event that a transaction is contested.

Another important issue lies with customer concern surrounding the requirement for the customer to surrender their credit card to someone they don't know while the wait staff disappears to process the account, which represents a security risk.

By the same token, restaurant operators also encounter difficulties with the current lengthy and complicated checkout procedure. Some of the issues restaurant operator face today involve improving the number of table turns in the busy hour; Freeing wait staff from tasks not directly associated with waiting customers, and of course improving customer satisfaction.

Figure 8:
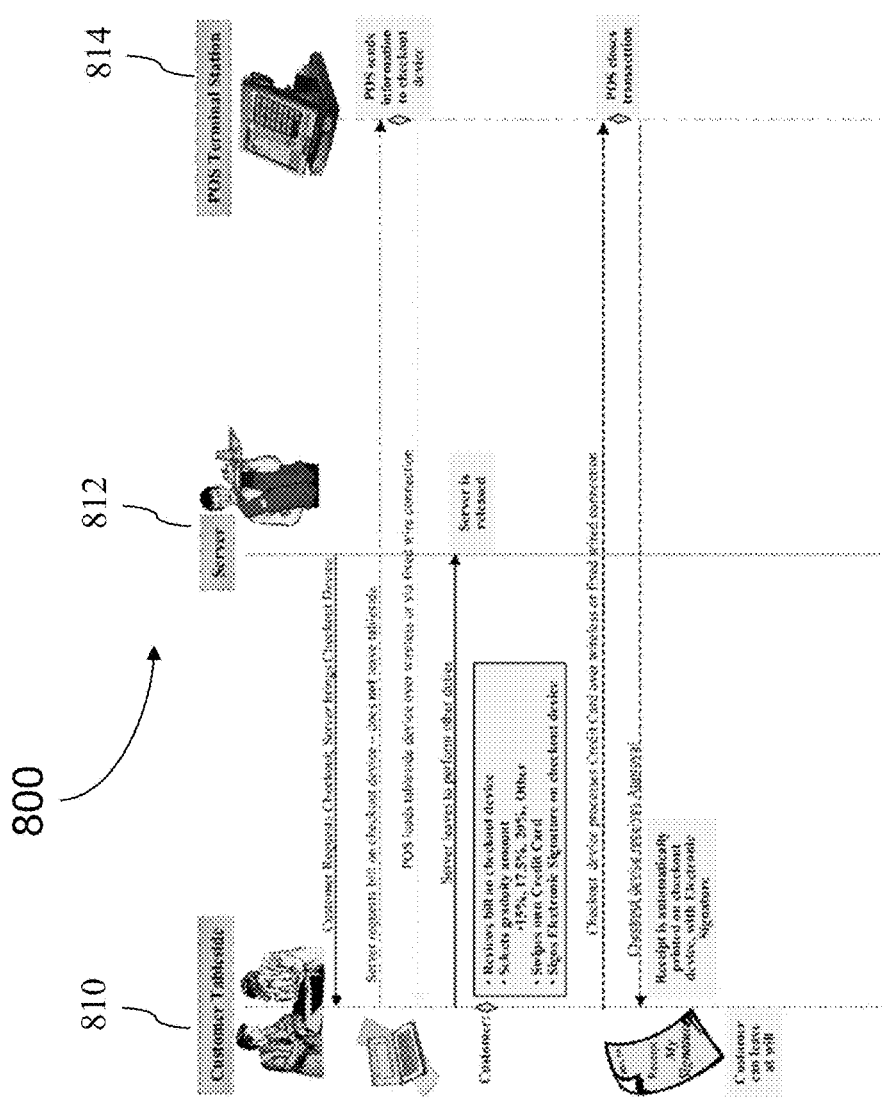
FIG. 8 illustrates a self-checkout procedure.

FIG. 8 illustrates a self-checkout procedure 800.

Customer Self-Checkout

The invention proposes a methodology for a Customer Self-Checkout Process to address these problems in a beneficial solution for both the customer and the operator.

In this procedure, the customer 810 must find the server 812 to convey that they wish to checkout. At this point the server can remove from their belt a portable checkout device that contains all the necessary components for the procedure including a touchscreen and input device, a credit card swipe, a wireless connectivity device and a printer.

Without leaving the table, the server can wirelessly signal back to the POS system 814 to upload the bill to the device. The POS system communicates the information to the device wirelessly.

Once the transmission is complete, the server places the device into a customer oriented mode of operation which effectively prevents the customer from performing unauthorized activities. The server then leaves the device with the customer at tableside, and can leave to perform other duties.

The customer reviews the bill for accuracy directly on the device. The customer can select the gratuity amount they wish to leave by selecting preset buttons for selections such as 15%, 17.5%, 20%, or can manually enter an amount using an touchscreen keyboard or other input method. By selecting a preset button, the system will calculate the exact amount for gratuity on behalf of the customer, and automatically add the total.

The customer can then digitally sign their name on the touchscreen device using the included stylus. The customer can then swipe their own credit card on the device. The device will then communicate wirelessly with the POS system to process the credit card for the exact amount including the gratuity in one procedure, thereby eliminating a second communication with the credit card processing center.

Once approved by the credit card processing center, the POS system will communicate with the device which will then print a single receipt directly on the device for the customer which includes a printout of their digital signature previously captured. The customer is then free to leave with a single paper receipt.

The device will communicate over the internet or with a local server to store the image or bitmap of the customer's digital signature and record the transaction events for a later retrieval should it be required to, for example, prove a dispute.

The digital capture information can also be stored in the POS system as part of the transaction information.

The device or the Central Management System can inform the server that the transaction has been completed. The server can then retrieve the device from the table at the same time as clearing the table for the next customers.

The device of the Central Management System can also inform the Table Management System that the transaction has been completed. The Table Management System can then update the Queuing system.

If the device does not incorporate an onboard printer, the final customer receipt can be printed to a centralized printer which either the customer can pick up on their way out, or a restaurant staff can deliver to the table.

Alternatively the customer can choose to have an invoice sent to their home via regular post or to an e-mail address. The invoice can be sent as a text file or as a hyperlink to a secure site where an actual image of the receipt is stored or generated that can then be printed on the customer's home or office printer.

Split Checks

The device can also handle splitting checks in a similar manner as previously described. In more detail, when the bill is uploaded to the device, the individual list of items with their prices can be displayed as objects. By selecting a Split Check mode, the first customer can select the items that they have purchased by pointing to them on the device.

Once all items for the first customer have been identified, the customer can select to checkout, after which they will be prompted to sign their name, add a gratuity and to swipe their credit card as described, after which a printout would be made.

The device can then be handed to the next payee who will follow the same procedure among the list of remaining items on the bill. This procedure can be performed until all payees have paid and there are no remaining items on the bill.

The above described checkout process is significantly less labor intensive and burdensome on both the server and the customer, not prone to calculation errors, and reduces the paper trail of documents to just one optional paper receipt for the customer.

For the restaurant operator, there is no paper receipt required. Should a dispute arise, the operator can enter the system and search by date or other criteria for the receipt stored in the database, and then printout only that receipt when required.

From a security perspective, the customer was able to maintain control of their credit card at all times, reducing the possibility of fraud. All wired and wireless transactions are handled using security techniques to minimize the risk of fraud.

If there are multiple payees within a single party, the individual customers can handle the process themselves using the Split Checks procedure without requiring support from the wait staff The effects of this checkout procedure and methodology include improved customer satisfaction, improved customer credit card security, faster table turns as customers can leave at will without having to wait for wait staff, improved wait staff efficiencies resulting in increased number of tables that can be supported by wait staff.

In this process, the balance of power is placed in the hands of the customer to decide when they wish to close their account and leave the premises. Effectively, it is up to the customer to decide when the dining experience is over. The solution not only contributes to customer satisfaction, but also results in the table being cleared earlier which in turn results in faster table turns for the restaurant operator which can ultimately contribute to increased profitability.

The reduction in time is particularly beneficial for attracting busy business customers at lunchtime that are on a schedule to be back at office, or customers bound by an entertainment event following dinner such as a movie or ballet. In such cases the Self Checkout System can be an attracting element for customers choosing a dining establishment.

The Self Checkout process supports Digital Signature Capture in which the customer signs their name on the screen, and the signature is digitally captured and stored as an image such as a bitmap. Typically the amount of storage required is very little, with current technologies around 1 kilobyte of data.

From the customer perspective, they will receive the printout with their actual digital signature imprinted on the receipt. Of significant benefit to the restaurant operator is that the procedure is entirely paperless—which means there is no longer the need to manage and maintain a paper trail of each transaction.

The digital signature from the customer along with the details of the transaction are stored in a secure processing center to which the operator has real-time online access from anywhere in the world via the internet. In the instance where the operator must prove a transaction, they can search and locate the transaction online, and print a copy of only that transaction, containing the digital signature from the customer.

Electronic Survey

Following the payment and checkout procedure, the customer can be offered to participate in a survey directly on the device, without having to manually process handwritten cards as in the past. By incorporating the solution as part of the checkout procedure, the chances of the customer completing the survey are increased, providing the operator with a wealth of customer data.

The survey can be stored locally in the device, or uploaded in real-time. The survey responses recorded can be downloaded to the Central Management System and directed to a Survey System to compile the results. The results of the compiled surveys can be accessed by the restaurant staff or management for review.

Individual survey results can result in actions, such as a manager being paged if responses are poor, loyalty program coupons being offered to the customer to entice them to return or introduce the establishment to new potential patrons, and can be used as input to the customer profile to be taken into account at subsequent visits to the restaurant when the customer logs in or has completed the identification process.

Partnership Promotions

The solution offers the potential for new revenue streams from partnership promotions with participating establishments by promoting post-dining entertainment suggestions and promotional coupons that can be printed on the integrated printer. Examples include uploading the up-to-date movie schedule for local theatres in the area from which tickets can be purchased, or menus from local dessert and coffee shops for which coupons can be printed.

For additional details refer to section on Tableside Services.

Closing Account

On closing the account for the period (typically the duration of a dining session), the Central Management System records the events in the customer profile to be able to better serve the customer at a future visit, as well as provide statistical information for the restaurant operator (for example, what meals were popular for lunch today). The system can print coupons to encourage return business as part of a loyalty program.

Runners and Animators

Throughout the process it should be noted that the customer need not participate in all parts of the experience described above, nor must they begin with the first step. Rather, it is a dynamic process in which one can choose where to join and where to exit, and participate as much or as little as one chooses. At any point in the process, the customer can request support from their table staff, who can aid and educate the customer, or can handle the complete transaction on behalf of the customer in their presence.

Using the methodologies and capabilities described in the invention can change the list of responsibilities of a traditional server or wait staff. As such it is considered appropriate to introduce new terminology for the staff participating in the processes defined in the invention—namely "runners" and "animators".

As the customer can generate their own order and can checkout with little or no wait staff intervention, the server's remaining responsibilities are to deliver the order to the customer when it is prepared, and are called runners.

Key to the assuring the successful adoption of the new methods and capabilities by customers and patrons at large is recognition of the need for education to help customers become familiar and appreciate the new processes and capabilities.

With this in mind, another important responsibility of the wait staff in the new model is to educate customers. In order to make the education experience as pleasant as possible for customers, it is critical that the wait staff educators maintain a positive attitude while educating. The wait staff that participate in this process are called "Animators".

Business Models

The development, deployment and maintenance of the new methodologies and capabilities described in the invention also lend themselves to new business models.

To become a financially viable opportunity, new products associated with the new methodologies and processes described in the invention need to demonstrate financial benefits to restaurant operators with minimal up-front investment costs, and short payback periods.

In order to address these business requirements, the invention proposes a three-tiered business model that can be tailored to meet the needs of individual operators within different market segments (e.g. fine dining, casual dining, convenience and fast-food, etc.)

The three-tiered model is comprised of the following options:

1. Outright Purchase: This model stipulates a one-time outright purchase of the methodologies and capabilities via products and services, including installation and annual ongoing support contract.
2. Subsidy: The restaurant operator processes all or a portion of all financial transactions (in particular credit cards) from their establishment through an account provided by the supplier, instead of through a third-party processor. The supplier will earn the financial processing fees that were previously being paid to the third party processor. In exchange, the operator will receive the methodologies and capabilities at no cost. Typically in this model the restaurant operator will have to guarantee minimum monthly transaction processing.
3. Combination: This model stipulates a reduced purchase price of the methodologies and capabilities, combined with the processing of financial transactions via an account provided by the supplier instead of through a third-party credit card processor, subject to guaranteed minimum monthly transaction processing.

While Model 1 (Outright Purchase) is typically attractive to higher-ticket establishments in the fine dining segment, significant opportunity lies in Model 2 (Subsidy).

Model 2 provides a minimal barrier to entry for operators by requiring little initial capital outlay, and often a minimal change in their current financial processing fees (the fees remain similar if not the same, however they are being paid to the supplier rather than a third-party processor).

Figure 9:
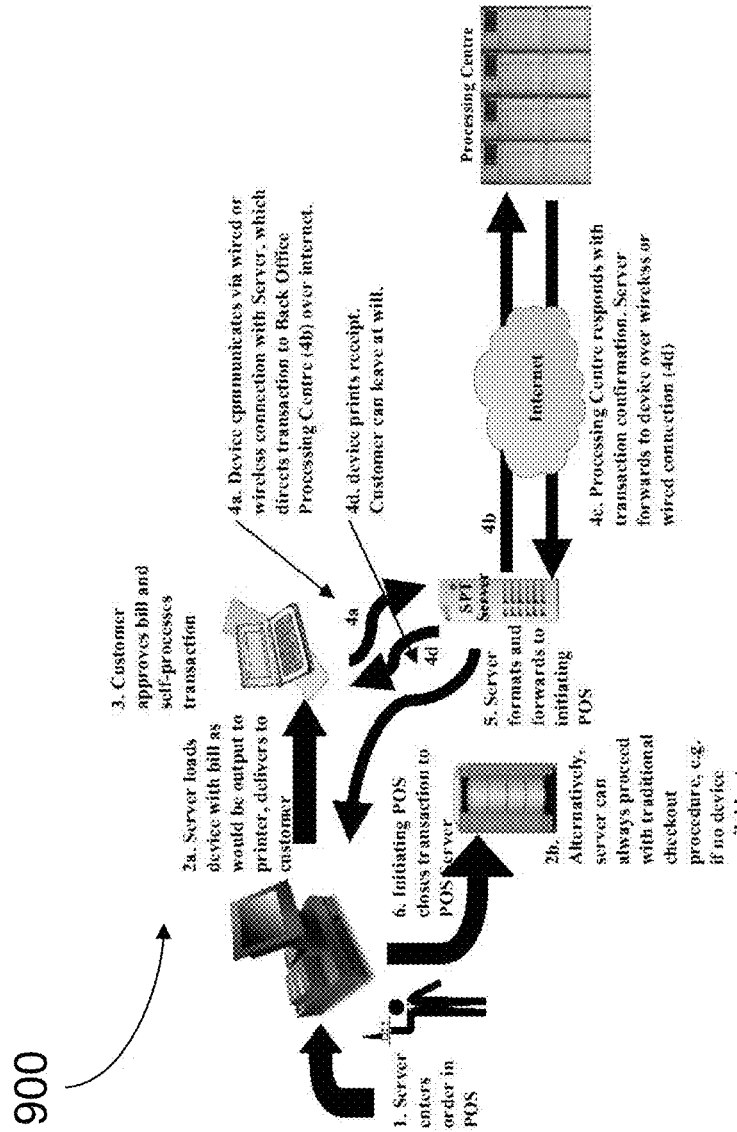
FIG. 9 illustrates a further checkout procedure.

FIG. 9 illustrates a further checkout procedure 900.

Configuration

The methodology and capabilities described in the invention typically incorporate the following components:

A Tableside Device and/or a Handheld Device

Application and Web Servers for control and management of the features

Wired and wireless communication mechanisms for supporting transactions between the various devices and components Payment Processing and Back Office Systems for supporting the execution and management of payment transactions The Tableside Device typically includes these hardware and software components:
- Backlit display with touch screen and attached stylus or display with other forms of input devices such as a mouse and/or keyboard
- Integrated wired or wireless modem (CDPD, CDMA 1×RTT, GSM/GPRS, 802.11b) supporting the transmission of transactions over various protocols including but not limited to TCP or UDP over IP.
- Signature Capture software
- Integrated printing device such as a thermal printer A typical process flow 900 for the methodology and capabilities described in the invention is shown in FIG. 9.

Cafeteria Process

In a cafeteria style establishment in which customers physically pick up their own items, a methodology for improved payment mechanisms can be beneficial.

Traditionally a customer will choose the items they wish to consume from a display case. The establishment will then manually tally the items and charge the customer. Typically the customer will choose to select all the items they wish to consume in one pass of the display since they do not want to have to return and start at the head of the queue for each item they wish to consume. This means that the customer will choose the appetizer at the same time as the main course at the same time as dessert.

Instead, using the methodologies and capabilities described in the invention, it is possible to improve the cafeteria process. Customers can be empowered to tally their own items by identifying themselves to the Ordering System when they choose a selection.

Customers can either manually enter the information into a device themselves similar to the self ordering system previously described. Alternatively customers can use identification techniques to identify themselves to the ordering system when they choose an item. For example, a customer could swipe their credit card which could be used as an identity device, in the display that is associated with certain items. If a customer chooses to take two desserts, they would swipe their credit card or identity card twice.

Other identity devices can be used. Using RFID technology, the customer would swipe their RFID tag in front of the receptor unit associated with the item they wish to consume. Using micro-payment techniques, the system uses the identity devices to associate the items chosen with a customer. At the end of the period typically when the customer is ready to leave the establishment, a payment and settlement process will take place for all the items selected. This could use the customer self-checkout process previously described.

In order to prevent fraud such as customers taking items from the display without identifying themselves to the system, various techniques can be used to aid in prevention. Radio frequency devices can be embedded in the plates and serving material or even in the consumable parts that would identify when they have been removed from the display. If an identity has not been associated with the action, an alarm can be invoked.

Alternatively the items can be physically locked in such a manner that they cannot be released until an identity has been associated with the item. In this case a physical barrier such as a glass door can prevent a customer from taking the item until they have swiped their identity card, for example. Another methodology is to use serving dishes that contain metal which will be held to an electromagnet until the identity has been associated with the item. At that point the current to the electromagnet would be arrested and the plate could be removed.

Thus, though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications

I claim:

1. A method, comprising:
    logging a customer unit into a restaurant dining system with a mobile device;
    when no table at the restaurant is available:
        placing the customer unit on a waiting list for a table; and
        informing the customer unit via the mobile device that the table is ready for the customer unit;
    receiving and storing at least one customer data element from the customer unit in a database, wherein the at least one customer data element comprises the at least one request from the mobile device and at least one of a menu item selection or other item selection performed during at least one of pre-dining, dining and post-dining within the restaurant;
    uploading, by the restaurant dining system, a bill for the at least one item to the mobile device; and
    performing a self-checkout whereby payment for the at least one item is submitted by the customer unit via the mobile device, and wherein the payment is submitted without interaction with a restaurant worker.

2. The method of claim 1 wherein the customer unit is a single group of people.

3. The method of claim 1 wherein the customer unit is a single person.

4. The method of claim 1 wherein the mobile device is at least one of a mobile device of the customer unit and a mobile device of the restaurant.

5. The method of claim 1 further comprising:
    identifying, by the restaurant dining system, the customer unit;
    managing, by the restaurant dining system, queue assignment that includes the waiting list; and
    updating, by the restaurant dining system, a table management system.

6. The method of claim 1 comprising sending an interactive restaurant menu to the mobile device, via the restaurant dining system.

7. The method of claim 1 wherein the restaurant dining system includes a self-check out and payment processing system that uploads the bill, the method further comprising:
    capturing, by the self-check out and payment processing system, a digital signature from the mobile device.

8. The method of claim 1, further comprising:
    providing, by the restaurant dining system, a post-dining survey;
    collecting, by the restaurant dining system, at least one customer data element from the customer unit via the mobile device; and
    storing the customer data element in the database.

9. The method of claim 1, further comprising enabling, by the restaurant dining system, the customer unit to purchase an entertainment unit via the mobile device and receive a confirmation of the entertainment unit purchase.

10. A system, comprising:
    at least one processor;
    memory;
    wherein the at least one processor and the memory are communicably coupled to one another;

wherein the memory includes instructions, that when read by the processor:
receive and store at least one customer data element from the customer unit in a database, wherein the at least one customer data element comprises the at least one request from the mobile device and at least one of a menu item selection or other item selection performed during at least one of pre-dining, dining and post-dining within the restaurant;
upload a bill for the at least one item from a restaurant to the mobile device; and
submit payment for the at least one item by the customer unit via the mobile device, wherein the payment is submitted without interaction with a restaurant worker.

11. The system of claim 10 wherein the memory includes the instructions, that when read by the processor store a digital receipt in the memory.

12. The system of claim 10 wherein the mobile device includes a graphical user interface for selection of a gratuity by the customer unit.

13. The system of claim 10 wherein the memory includes the instructions, that when read by the processor store a customer data element comprising an online payment service provider account number in the memory.

14. The system of claim 10 wherein when the restaurant is a cafeteria establishment, the system allows the mobile device to perform at least one of: identify cafeteria items selected by the customer unit and pay for the identified cafeteria items.

15. The system of claim 14 wherein the items are tagged with RFID tags, wherein the mobile device performs at least one of: identifies the items by utilizing the RFID tags and tallies the items by utilizing the RFID tags.

16. The system of claim 10 further comprising a dining system that sends an interactive restaurant menu to the mobile device.

17. The system of claim 10 wherein submission of payment is facilitated by at least one of: an RFID card, a credit card, a debit card, electronic check, an electronic wallet and an online payment.

18. A method, comprising:
identifying at least two people at a table based on input from a mobile device;
associating the at least two people at the table with at least one restaurant menu item ordered via the mobile device;
receiving and storing at least one customer data element from the customer unit in a database, wherein the at least one customer data element comprises one or more of at least one request from the mobile device and a menu item selection or other item selection performed during at least one of pre-dining, dining and post-dining within the restaurant;
splitting a bill into at least two bills each respectively associated with each one of the at least two people;
presenting, via the mobile device, the at least two bills to each one of the at least two people; and
submitting, via the mobile device, payment related to the at least two bills by at least one of the at least two people without interaction with a restaurant worker.

19. The method of claim 18 wherein associating the at least two people at the table with the at least one restaurant menu item is accomplished by at least one of the at least two people manipulating a software system graphical user interface on the mobile device.

20. The method of claim 18 wherein submitting the payment, via the mobile device, comprises at least one of:
running, by a the mobile device, a digital signature capture software and payment processing software; and
providing, via the mobile device, a customer receipt.

* * * * *